(12) United States Patent
Kunimatsu et al.

(10) Patent No.: US 8,200,091 B2
(45) Date of Patent: Jun. 12, 2012

(54) WAVELENGTH DIVISION MULTIPLEXING DEVICE AND METHOD OF DETECTING INPUT BREAK OF OPTICAL SIGNAL

(75) Inventors: Kazuhiro Kunimatsu, Kawasaki (JP); Takeshi Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 255 days.

(21) Appl. No.: 12/642,514

(22) Filed: Dec. 18, 2009

(65) Prior Publication Data

US 2010/0098423 A1   Apr. 22, 2010

Related U.S. Application Data

(63) Continuation of application No. PCT/JP2007/000723, filed on Jul. 2, 2007.

(51) Int. Cl.
*H04J 14/02* (2006.01)

(52) U.S. Cl. ............ 398/81; 398/147; 398/159; 398/33; 398/38

(58) Field of Classification Search ............ 398/81, 398/147, 158, 159, 160, 135, 136, 79, 202, 398/208, 209, 212, 213, 214, 33, 38, 30, 398/31, 32, 25, 29, 149
See application file for complete search history.

(56) References Cited

U.S. PATENT DOCUMENTS

| | | | |
|---|---|---|---|
| 5,999,289 A * | 12/1999 | Ihara et al. | 398/147 |
| 7,689,126 B2 * | 3/2010 | Nemoto | 398/81 |
| 2001/0024306 A1 | 9/2001 | Okuno | |
| 2004/0114936 A1 | 6/2004 | Sugihara et al. | |
| 2004/0161234 A1 | 8/2004 | Ozawa | |
| 2005/0047791 A1 | 3/2005 | Miyazaki | |
| 2007/0065162 A1 * | 3/2007 | Kikuchi | 398/208 |

FOREIGN PATENT DOCUMENTS

| | | |
|---|---|---|
| EP | 0 604 040 A1 | 6/1994 |
| JP | 6-222237 | 8/1994 |
| JP | 11-317709 | 11/1999 |
| JP | 2000-201106 | 7/2000 |
| JP | 2001-160780 | 6/2001 |
| JP | 2003-224523 | 8/2003 |
| JP | 2004-247780 | 9/2004 |
| JP | 2005-79833 | 3/2005 |

OTHER PUBLICATIONS

M.N. Peterson et al.; Dispersion monitoring and compensation using a single inband subcarrier tone; Oprical Fiber Communication Conference and Exhibit; vol. 3, 2001; pp. WH4-1 to WH4-3.
International Search Report issued Jul. 2, 2007 in corresponding PCT/JP2007/000723.

* cited by examiner

*Primary Examiner* — Hanh Phan
(74) *Attorney, Agent, or Firm* — Fujitsu Patent Center

(57) ABSTRACT

A wavelength division multiplexing device comprises a detection unit to detect the low-frequency signal in the optical signal; and a control unit to control to make the dispersion compensator perform a compensation operation by determining that the optical signal is being input when a low-frequency signal is detected in the optical signal in the detection unit, and to control to stop a compensation operation of the dispersion compensator by determining that there is an input break of the optical signal when a low-frequency signal is not detected in the optical signal in the detection unit.

5 Claims, 8 Drawing Sheets

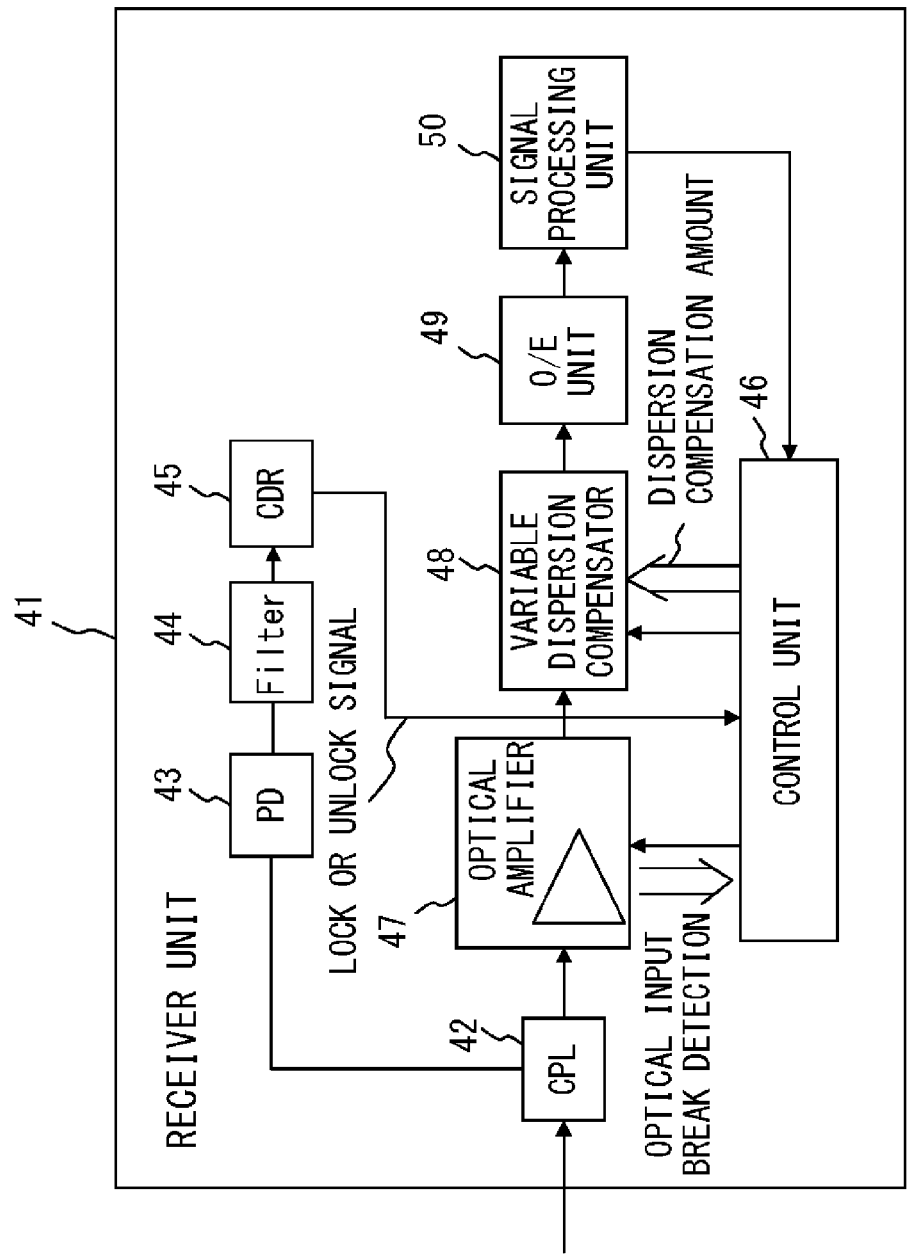
F I G . 5

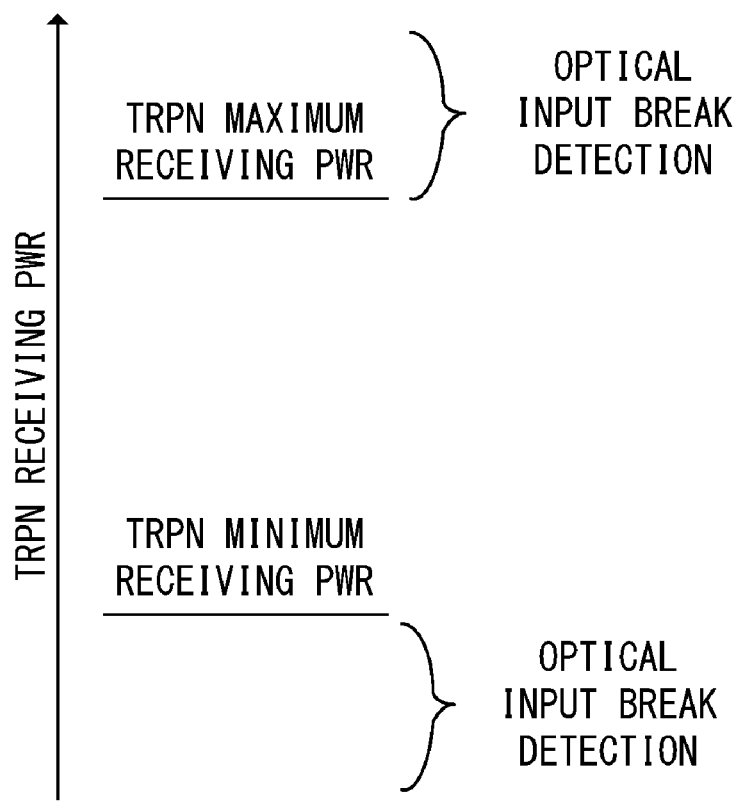
F I G. 6

WAVELENGTH DIVISION MULTIPLEXING DEVICE AND METHOD OF DETECTING INPUT BREAK OF OPTICAL SIGNAL

CROSS-REFERENCE TO RELATED APPLICATIONS

This application is a continuation application of International PCT Application No. PCT/JP2007/000723 which was filed on Jul. 2, 2007.

FIELD

The embodiments discussed herein are related to a wavelength division multiplexing device and a method of detecting an input break of an optical signal, both of which are used in a wavelength division multiplexing system.

BACKGROUND

FIG. 1 illustrates a configuration of a wavelength Division Multiplexing (WDM) system.

A wavelength division multiplexing device 11 on the transmitter side includes a plurality of transponders 12a through 12n for converting various types of client signals (such as signals based on SONET, GbE, 10BbE or the like) into optical signals of plural wavelengths, a multiplexer 13 for coupling plural optical signals of different wavelengths, and a WDM-Post amplifier 14.

An optical signal obtained by the multiplexing performed by the wavelength division multiplexing device 11 on the transmitter side is transmitted, through an optical transmission line 15, to a wavelength division multiplexing device 16 on the receiver side. The wavelength division multiplexing device 16 on the receiver side includes a WDMPre amplifier 17, a demultiplexer 18 for demultiplexing wavelength-multiplexed optical signals, and a plurality of transponders 19a through 19n for converting optical signals of respective wavelengths into the original client signals.

The transmission speed of wavelength division multiplexing systems has been increased in order to increase their transmission capacity, and as a result of this, optical signals on transmission lines are influenced by dispersion at an ignorable level. This has made it necessary to perform dispersion compensation not only for all wavelengths en masse but also for each wavelength.

FIG. 2 illustrates a circuit diagram of a receiver unit 21 of a transponder having a variable dispersion compensator for performing dispersion compensation for each wavelength.

The receiver unit 21 of the transponder includes an optical amplifier 22 for amplifying optical signals, a variable dispersion compensator 23 for compensating for dispersion of signals output from the optical amplifier 22, an optical-electrical (O/E) conversion unit 24, a signal processing unit 25 for converging electric signals into client signals, and a control unit 26.

The control unit 26 has a function of adjusting the amount of compensation performed by the variable dispersion compensator 23 into an optimum value on the basis of outputs from the signal processing unit 25, a function of detecting an input break of an optical signal, and a function of stopping operations by the optical amplifier 22 and by the variable dispersion compensator 23 when it has detected an input break of an optical signal. When the control unit 26 cannot detect an optical signal higher than a prescribed level, it determines that an input break of an optical signal has occurred.

FIG. 3 illustrates the levels of optical signals, ASE (Amplified Spontaneous Emission) light, which is noise made in the optical amplifier 22, and an LOL (Light Of Loss) threshold value.

Conditions under which transponders can receive normal optical signals are determined by the power and the OSNR (Optical Signal-To-Noise Ratio), and LOL threshold values for detecting an input break of optical signals under those conditions are set.

In FIG. 3, an optical signal 1 of CH_n1 has sufficient optical power, and also clears the criterion of OSNR. An optical signal 2 of CH_n2 has optical power that is low but higher than the LOL threshold value, and that power has exceeded the minimum reception power. ASE light of CH_m is noise made in the optical amplifier 22, and its power is higher than the LOL threshold value in this case.

When the level of the ASE light is higher than the LOL threshold value, input breaks cannot be detected because there is ASE light even when an input break of optical signals has occurred.

A method in which the optimum points are searched for while monitoring the quality of an optical signal is used for adjusting the amount of dispersion compensation in the transponders 19a through 19n in the receiver side. When no optical signals are input to the transponders 19a through 19n, the quality of an optical signal cannot be monitored, and thus a method in which the optimum points are searched for cannot detect an input break, and this offers a risk that an inappropriate dispersion compensation amount might be set or that a process of searching for optimum points of dispersion compensation might be repeated endlessly because such optimum points cannot be found.

If an inappropriate dispersion compensation amount is set, the dispersion compensation amount has been shifted greatly when an optical signal is input again, and this causes a problem in which a process of searching for the optimum point of compensating for dispersion takes too long a time. Additionally, when a variable dispersion compensator continues its operation for searching for the optimum point with no optical signal having been input to it, the lifetime of that variable dispersion compensator is shortened.

Patent Document 1 discloses a configuration in which plural low-frequency signal sources are provided for generating low-frequency signals of different frequencies, optical signals of wavelengths λ1, λ2, . . . are amplitude modulated using a different low-frequency signal for each of the wavelengths of the light sources, and the amplitude-modulated optical signals are wavelength multiplexed so as to be output to an optical transmission line.

Patent Document 2 discloses a configuration in which a switch is provided for detecting a channel that is not transmitting optical signals so as to disconnect a line not transmitting optical signals when wavelength-division multiplexed optical signals are to be coupled.

Patent Document 3 discloses a configuration in which excitation light output levels of light sources are controlled so that the optical signal output level of an optical fiber amplifier can be constant and a wavelength-passing band of a wavelength-variable optical filter can be controlled in accordance with signals for controlling the light sources.

Patent Document 4 discloses a configuration in which the transmitter side modulates wavelength-multiplexed optical signals by using low-frequency signals, and the receiver side detects the low-frequency signals so as to control the passing band of a Fabry-Perot filter on the basis of results of the detection.

While the above patent documents disclose modulation of wavelength-division multiplexed optical signals using low-frequency signals, none of them discloses how to detect an input break of an optical signal when the level of ASE light is high.

Patent Document 1: Japanese Laid-open Patent Publication No. 2000-201106
Patent Document 2: Japanese Laid-open Patent Publication No. 2004-247780
Patent Document 3: Japanese Laid-open Patent Publication No. 11-317709
Patent Document 4: Japanese Laid-open Patent Publication No. 6-222237

SUMMARY

A wavelength division multiplexing device having a plurality of dispersion compensators for respectively compensating for dispersion of a plurality of optical signals of different frequencies, including an optical amplifier to amplify one of a plurality of optical signals of different frequencies that is modulated using a low-frequency signal; a dispersion compensator to compensate for dispersion of an optical signal output from the optical amplifier; a detection unit to detect the low-frequency signal in the optical signal; and a control unit to control to make the dispersion compensator perform a compensation operation by determining that the optical signal is being input when a low-frequency signal is detected in the optical signal in the detection unit, and to control to stop a compensation operation of the dispersion compensator by determining that there is an input break of the optical signal when a low-frequency signal is not detected in the optical signal in the detection unit.

It is to be understood that both the foregoing general description and the following detailed description are exemplary and explanatory and are not restrictive of the invention, as claimed.

BRIEF DESCRIPTION OF DRAWINGS

FIG. 5 illustrates a configuration of a receiver unit in a transponder according to an embodiment;
FIG. 6 illustrates relationships between levels of optical signals and input break detection signals.

DESCRIPTION OF EMBODIMENTS

Figure 1:
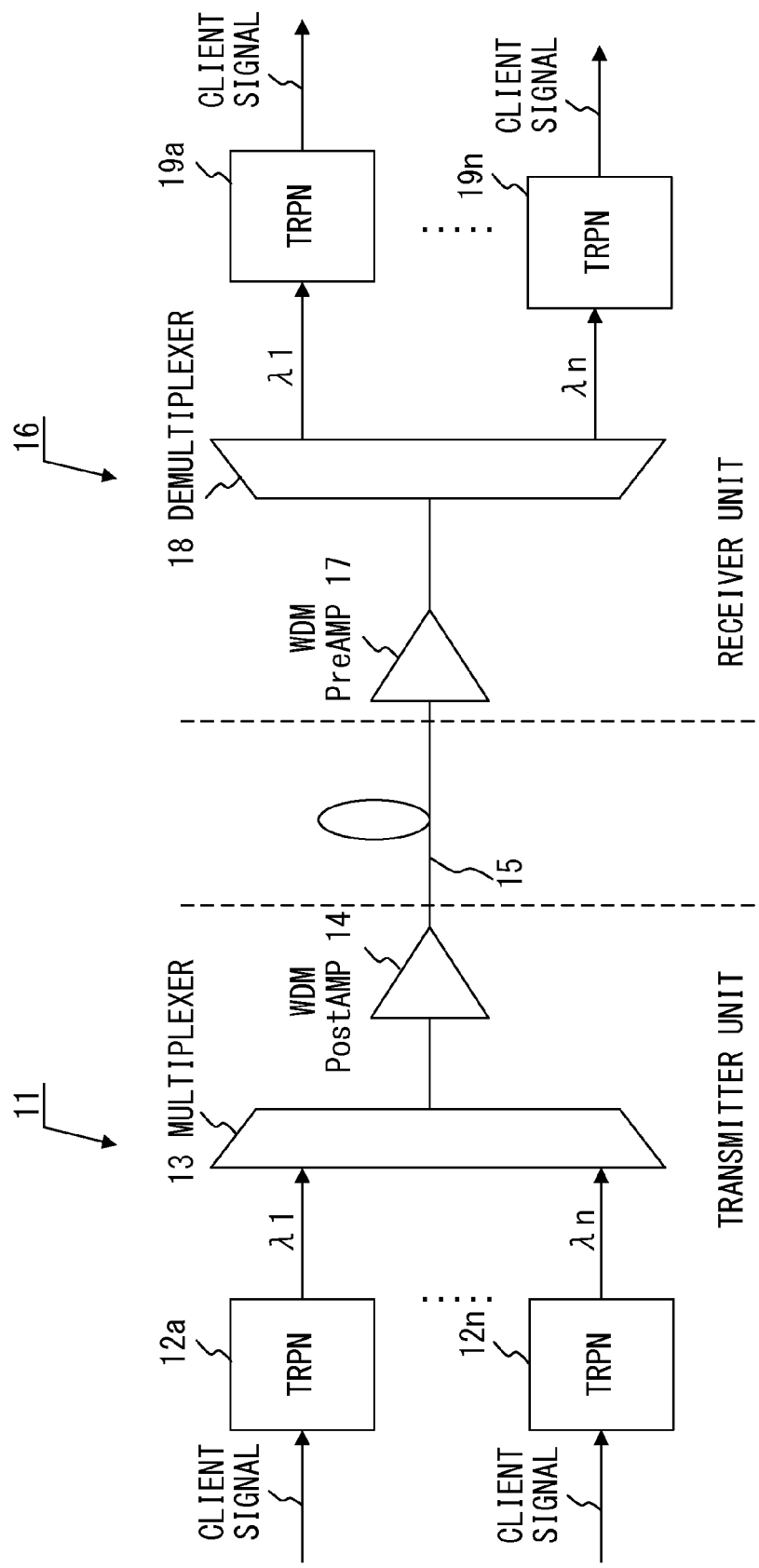
FIG. 1 illustrates a configuration of a conventional wavelength division multiplexing system.
Figure 2:
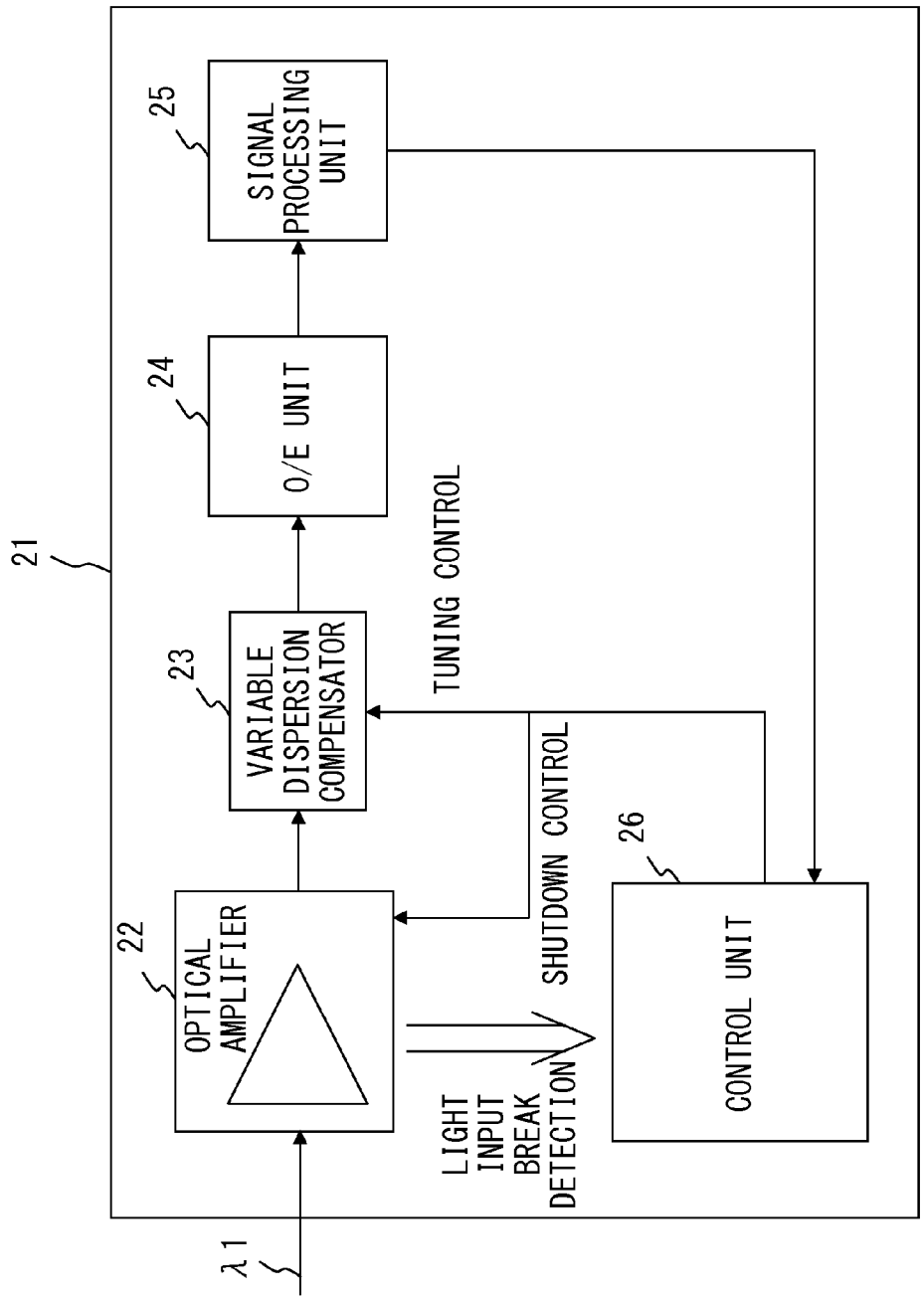
FIG. 2 illustrates a configuration of a receiver unit in a transponder.
Figure 3:
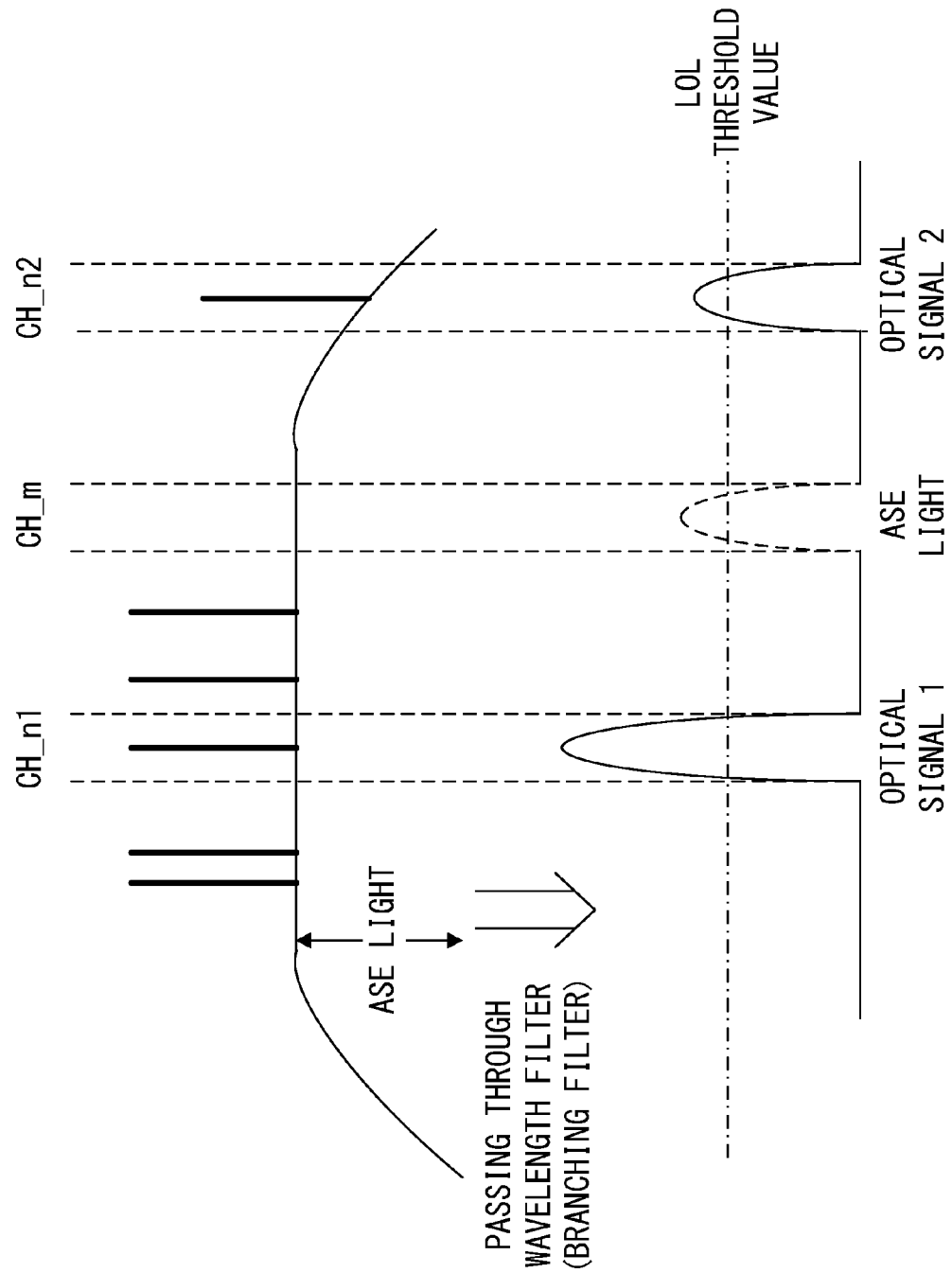
FIG. 3 illustrates optical signals and ASE light.

Hereinafter, embodiments of the invention will be explained by referring to the drawings. A wavelength division multiplexing system according to embodiments has a respective wavelength division multiplexing device for the transmitter side and the receiver side, similarly to the conventional wavelength division multiplexing system illustrated in FIG. 1. The wavelength division multiplexing system also transmits optical signals multiplexed by the wavelength division multiplexing device on the transmitter side to the wavelength division multiplexing device on the receiver side through an optical transmission line, and the wavelength division multiplexing device on the receiver side converts the multiplexed optical signals into the original client signals.

Figure 4:
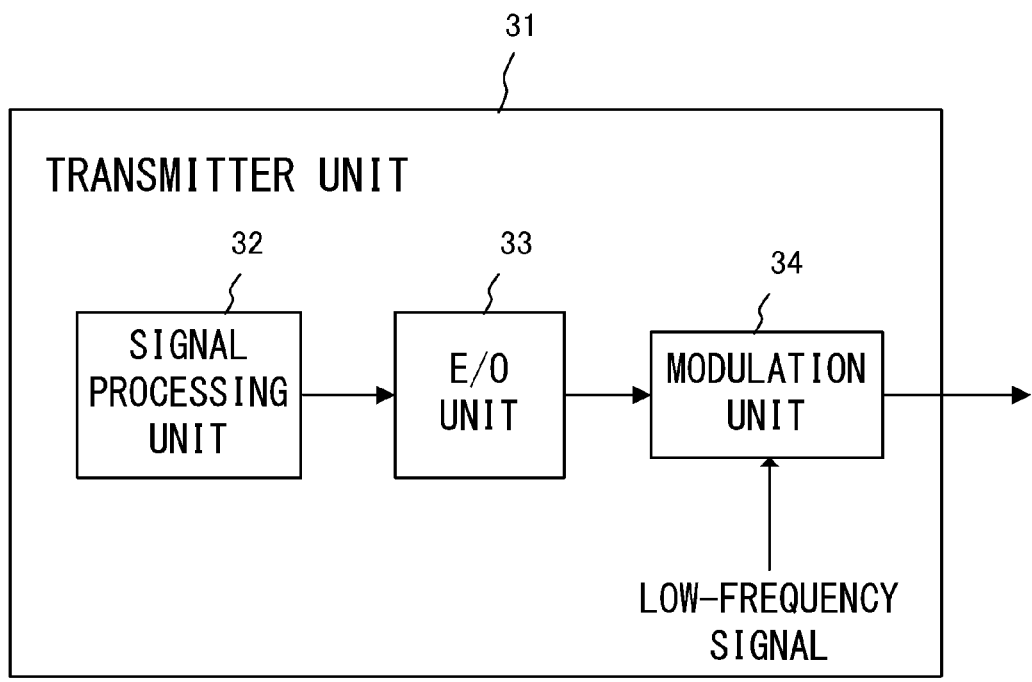
FIG. 4 illustrates a configuration of a transmitter unit in a transponder according to an embodiment.

FIG. 4 illustrates a configuration of a transmitter unit 31 of a transponder on the transmitter side of a wavelength division multiplexing system according to an embodiment.

The wavelength division multiplexing device on the transmitter side has a plurality of transponders for converting client signals into optical signals of plural frequencies (such as several hundred THz).

Each transponder includes the transmitter unit 31 illustrated in FIG. 4, and the transmitter unit 31 includes a signal processing unit 32, an electrical-optical conversion unit 33, and a modulation unit 34.

The signal processing unit 32 converts client signals into electric signals of a particular frequency, and the electrical-optical conversion unit (E/O unit) 33 converts the electric signals obtained by the conversion by the signal processing unit 32 into optical signals of a particular frequency. The modulation unit 34 amplitude modulates optical signals by using low-frequency (frequency on the order of KHz for example) signals, and outputs the modulated optical signals to a multiplexer (not illustrated).

FIG. 5 illustrates a configuration of a receiver unit 41 in a transponder on the receiver side. In FIG. 5, the receiver unit 41 includes an optical coupler (CPL) 42, a photodetector (PD) 43, a low-pass filter 44, and a clock-data recovery (CDR) circuit 45.

Optical signals input to the receiver unit 41 are branched by the optical coupler 42 into two directions, with one being output to an optical amplifier 47 and the other to the photodetector 43.

The photo detector 43 converts optical signals into electric signals, and outputs the resultant signals to the low-pass filter 44. The low-pass filter 44 is a filter that passes low-frequency signals used for modulating optical signals on the transmitter side, and blocks signals of frequencies higher than that low frequency. The clock-data recovery (CDR) circuit 45 (corresponding to a signal determination circuit) outputs a LOCK signal to a control unit 46 when synchronization of low-frequency signals output from the low-pass filter 44 is realized (in a locked state), and it outputs an UNLOCK signal to the control unit 46 when the synchronization of low-frequency signals cannot be realized (in an unlocked state). When the signal is "1", the signal is the LOCK signal, expressing a locked state, and when the signal is "0", the signal is the UNLOCK signal, expressing an unlocked state.

The receiver unit 41 includes, in addition to the above components, the control unit 46, the optical amplifier 47, a variable dispersion compensator 48, an optical-electrical (O/E) conversion unit 49, and a signal processing unit 50.

The optical amplifier 47 amplifies optical signals output from the optical coupler 42, and outputs the resultant signals to the variable dispersion compensator 48. The variable dispersion compensator 48 compensates for the wavelength dispersion of optical signals in accordance with the dispersion compensation amount specified by the control unit 46, and outputs the dispersion-compensated optical signal to the optical-electrical conversion unit 49.

The optical-electrical conversion unit 49 converts optical signals into electric signals, and outputs the resultant signals to the signal processing unit. The signal processing unit performs frequency conversion or the like on the electric signals output from the optical-electrical conversion unit 49 in order to convert those signals into the original client signal. The signal processing unit also outputs the converted signals into the control unit 46.

The control unit 46 determines whether or not there is an input break of an optical signal by using a light input break detection signal, which indicates whether or not the power of an optical signal input to the optical amplifier 47 is equal to or higher than the minimum receiving power of the transponders (or whether or not the power is higher than the maximum receiving power).

FIG. 6 illustrates the relationship between the received signal power of an optical signal input to a transponder and optical signal input break detection.

As illustrated in FIG. 6, when received signal power (PWR) of a transponder (TRPN) is lower than the minimum receiving power, a light input break detection signal is output. When an optical signal is equal to or higher than the maximum receiving power as well, a light input break detection signal is output. When the control unit 46 detects a light input break detection signal, it stops the operations of the optical amplifier 47, and also stops the compensation operations of the variable dispersion compensator 48. In addition, a circuit for detecting a light input break can be set in the optical amplifier 47, or can be set in the control unit 46.

FIG. 5 is referred to again, wherein the control unit 46 determines whether or not there is an input break of an optical signal on the basis of whether or not a light input break detection signal has been input, whether or not a lock signal has been output from the clock-data recovery circuit, or whether or not an UNLOCK signal has been output.

When the control unit 46 has determined that optical signals are being input normally, it changes a dispersion compensation amount output to the variable dispersion compensator 48 so that signals output from the signal processing unit 50 are of the optimum value. When the result of dispersion compensation has become the optimum value, the variable dispersion compensator 48 (or the control unit 46) stores, in a register (holding circuit), the dispersion compensation amount at that moment.

When the optimum value of a dispersion compensation amount is determined, the control unit 46 stores, in a storing unit (not illustrated), information indicating that optical signals have entered a communicating state (information indicating whether or not the dispersion compensation amount was adjusted). This storage unit stores information indicating that signals are in a non-communicating state when optical signals have not been input.

Information indicating whether signals are in a non-communicating state or a communicating state, in which an optical signal has been input once, is stored as described above, and thereby a dispersion compensation amount can be controlled using, as the initial value, a dispersion compensation amount stored in the above register, when an optical signal is input after an input break has occurred. This can reduce adjustment time consumed for determining an optimum value of a dispersion compensation amount.

A process of detecting an input break of an optical signal performed in the wavelength division multiplexing device on the receiver side will be explained by referring to the flowcharts illustrated in FIGS. 7 and 8. The processes described below are executed by the control unit 46.

Figure 7:
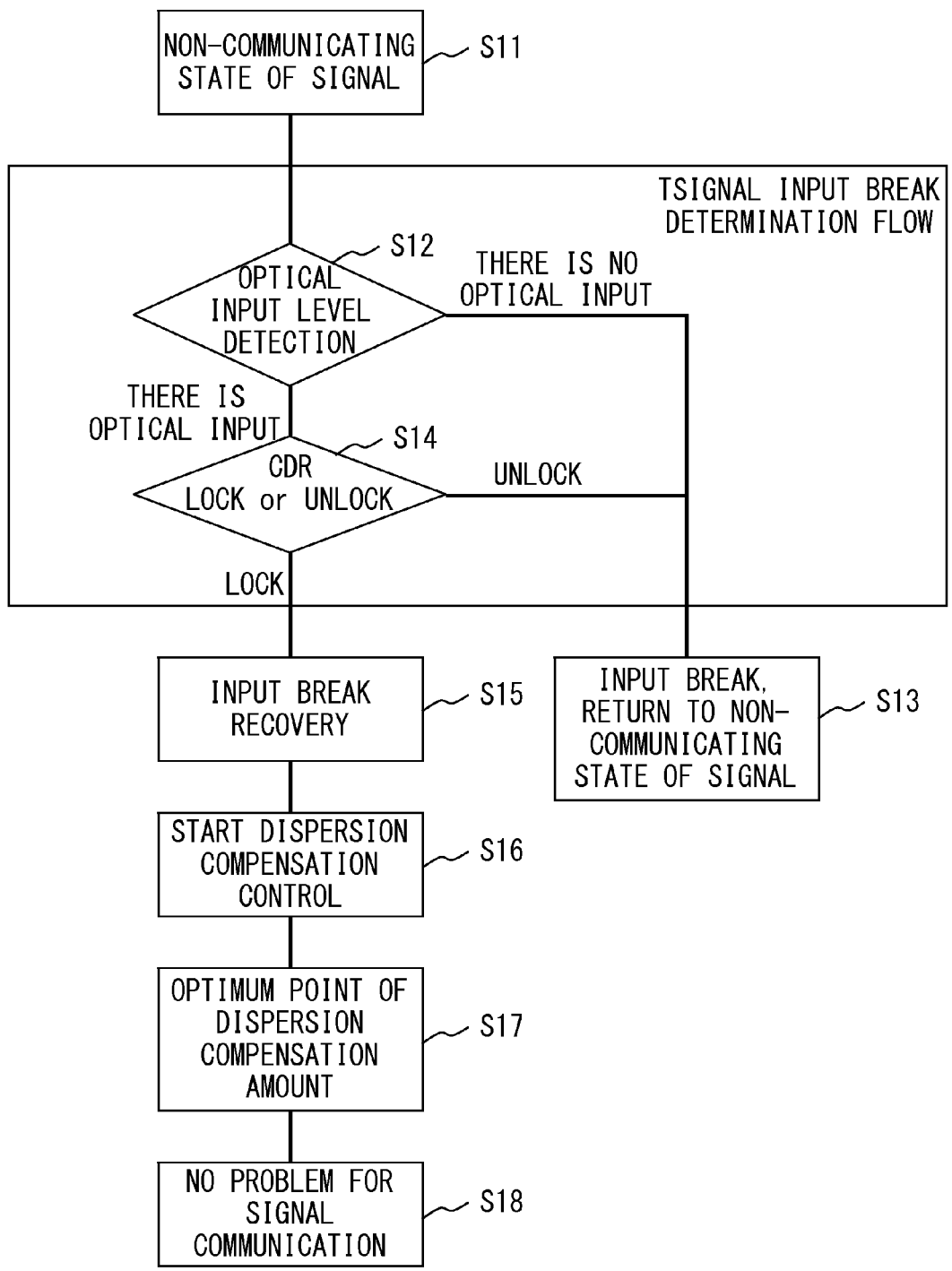
FIG. 7 illustrates a flowchart for a process of detecting an input break of an optical signal according to the first embodiment.

FIG. 7 illustrates a flowchart for a process of detecting an input break of an optical signal according to the first embodiment. This first embodiment stops the compensation operations of the variable dispersion compensator 48 when an input break of an optical signal is detected.

When signals are in a non-communicating state (a state in which no optical signals are input) (S11 in FIG. 6), an input level of optical signals is detected in step S12, and whether or not the input level is equal to or higher than a threshold value (LOL threshold value) is determined. When the input level of the optical signal is lower than a prescribed threshold value, the process proceeds to step S13, and the current situation is determined to be a state in which no optical signals are input (an input break state), and the process returns to step S11.

When the optical input level is equal to or higher than the prescribed threshold value in step S12 (Yes in S12), the process proceeds to step S14, and whether or not either a lock signal or an unlock signal was output from the clock-data recovery circuit is checked. The processes in steps S12 and S14 are for determining a signal input break.

When an unlock signal has been output from the clock-data recovery circuit (UNLOCK in S14), in other words, when a low-frequency signal was not detected in an optical signal, the process proceeds to step S13, and the current state is determined to be a signal input break state, and thereafter the process returns to step S11.

When a lock signal has been output from the clock-data recovery circuit (LOCK in S14), in other words when a low-frequency signal was detected in an optical signal, the process proceeds to step S15, and it is determined that a new optical signal was received or the signal input break was recovered. In the next step, step S16, compensation operations of the variable dispersion compensator 48 start being controlled. When dispersion compensation starts, a value, such as zero, is output as the initial value of a dispersion compensation amount.

In the next step, step S17, it is determined on the basis of the signal output from the signal processing unit 49 whether the amount has reached the optimum point of dispersion compensation. When the amount is not the optimum point, the dispersion compensation amount is changed in order to find the optimum point.

When the amount has reached the optimum point of dispersion compensation, the situation is determined to not be a problem for signal communications, and the dispersion compensation amount output from the control unit 46 to the variable dispersion compensator 48 is fixed to the value at that moment.

According to a method of detecting an input break of an optical signal according to the above described first embodiment, even when the level of the optical level output from the optical amplifier 47 is influenced by ASE light so as to be equal to or higher than the LOL threshold value, whether or not a low-frequency signal being modulated by the transmitter side is included in an optical signal is detected, and thereby whether or not an optical signal is in an input break state can be determined accurately while removing the influence of the ASE light. This makes it possible to prevent the variable dispersion compensator 48 from performing dispersion compensation operations needlessly when the variable dispersion compensator 48 is in an input break state.

Figure 8:
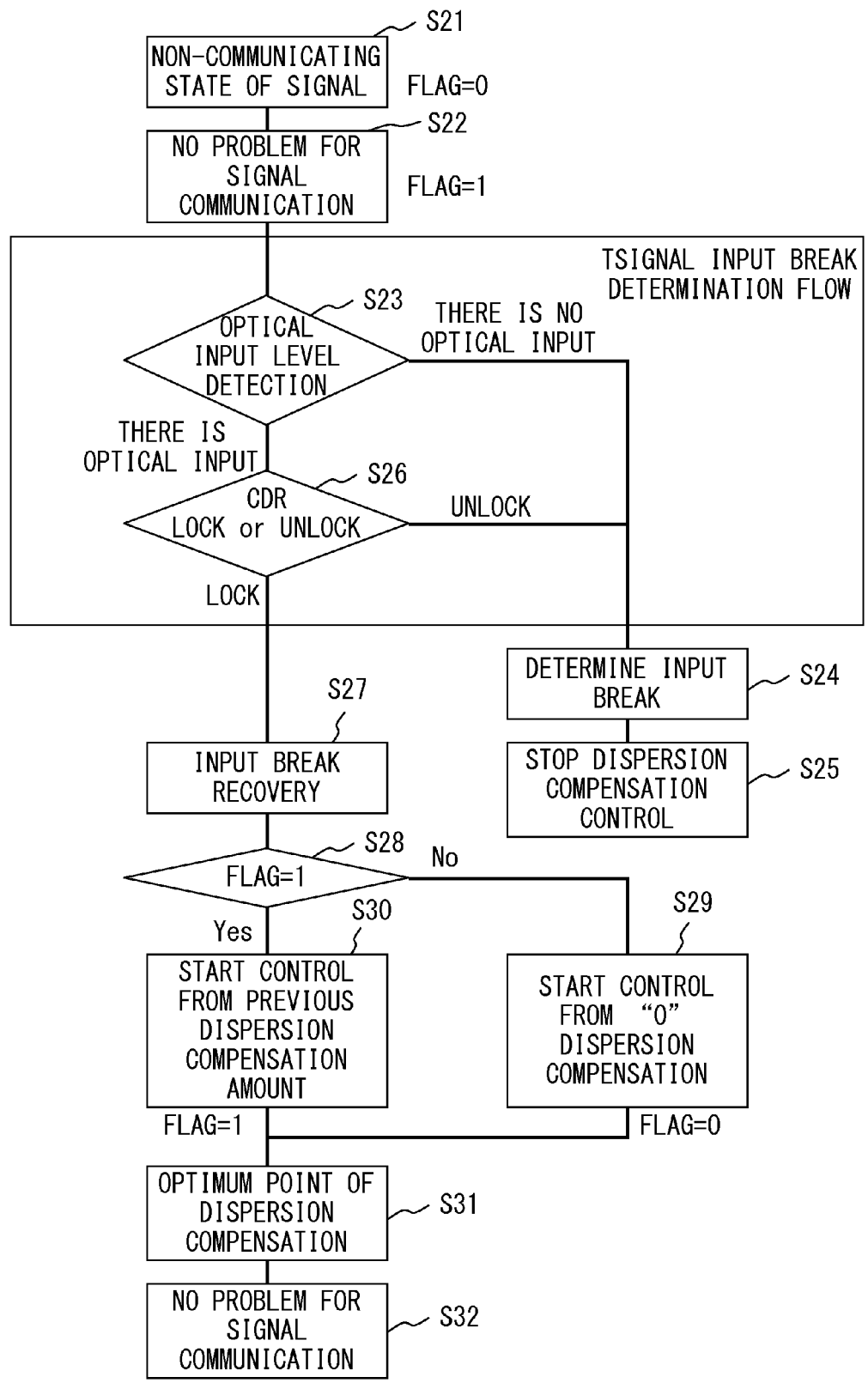
FIG. 8 illustrates a flowchart for a process of detecting an input break of an optical signal according to the second embodiment.

Next, FIG. 8 illustrates a flowchart for a process of detecting an input break of an optical signal according to the second embodiment. The second embodiment is intended to enable detection of a signal input break and the controlling of the dispersion compensation amount of the variable dispersion compensator 48 by using the dispersion compensation amount that is adjusted when an optical signal has been recovered.

When the current state is a non-communicating state (a state in which no optical signals are input and dispersion compensation is not being performed) in step S21 in FIG. 8, flag "FLAG" is set to "0".

When the current state is that there is no problem for signal communications (a state in which optical signals are input and dispersion compensation has been completed), flag "FLAG" is set to "1".

In step S23, whether or not the optical input level of the variable dispersion compensator 48 is equal to or higher than the LOL threshold value is checked. When the optical input level is lower than the LOL threshold value (no optical input in S23), the process proceeds to step S24, where the current state is determined to be a signal input break, and in the next step S25, dispersion compensation control for the variable dispersion compensator 48 is stopped.

When the optical input level to the variable dispersion compensator 48 is determined to be equal to or higher than the LOL threshold value in step S23 (there is optical input in step S23), the process proceeds to step S26, and it is determined whether a lock signal indicating that a low-frequency signal was detected in an optical signal was detected or an unlock signal indicating that a low-frequency signal was not detected was detected. The processes in steps S23 and S26 are for determining an input break of an optical signal.

When an unlock signal was detected in step S26 (UNLOCK in S26), the process proceeds to step S24, where the current state is determined to be a signal input break, and in the next step, step S25, dispersion compensation control for the variable dispersion compensator 48 is stopped.

When a lock signal was detected in step S26 (LOCK in S26), the process proceeds to step S27, and it is determined that a new optical signal was received or the signal input break was recovered.

For example, the clock-data recovery circuit 45 outputs a lock signal when synchronization of low-frequency signals extracted from the low-pass filter 44 is realized, and it outputs an unlock signal when the synchronization of low-frequency signals are not realized. When an unlock signal is output from the clock-data recovery circuit 45, the control unit 46 determines the current state to be an input break of an optical signal, and stops the compensation operations of the variable dispersion compensator 48. When a lock signal is output from the clock-data recovery circuit 45, the control unit 46 determines that a new optical signal was input or an optical signal was recovered from an input break state, and starts the compensation operations of the variable dispersion compensator 48.

In the next step, step S28, whether or not flag "FLAG" is "1" is determined. When flag "FLAG" is "0" (No in step S28), i.e., when an optical signal has been input for the first time, the process proceeds to step S29, and "0", which is the initial value of a dispersion compensation amount, is output to the variable dispersion compensator 48 so that dispersion compensation operations are started.

When flag "FLAG" is "1" (Yes in S28), i.e., when an optical signal was input and the optimum value of a dispersion compensation amount has already been set, the process proceeds to step S30, and the previous dispersion compensation amount stored in the register is output, as the initial value, to the variable dispersion compensator 48. This can greatly reduce adjustment time consumed for determining an optimum value of a dispersion compensation amount.

In the next step, step S31, when the amount has reached the optimum point of a dispersion compensation amount, the dispersion compensation amount at that moment is stored in the register. In the next step, step S32, flag "FLAG" is set to "1" in order to store information indicating that the situation became a communicating state of signals.

According to the above described second embodiment, an input break of an optical signal can accurately be determined on the basis of whether or not a low-frequency signal can be detected in an optical signal. Further, information indicating whether signals are in a non-communicating state or in a communication state, i.e., indicating whether or not dispersion compensation amount adjustment has been completed, is stored so as to be referred to when an optical signal has been input again after an input break, and when the information indicates a communication state, a dispersion compensation amount is controlled on the basis of the previous dispersion compensation amount as the initial value, and thereby time consumed for controlling dispersion compensation can be reduced.

As the above embodiment, an example has been explained in which the receiver unit 41 in a receiver-side transponder includes a circuit for detecting a low-frequency signal; however, a transmitter-side transponder may include the transmitter unit 31 and the receiver unit 41.

Also, the circuit configuration of the receiver unit 41 in a transponder is not limited to the one illustrated in FIG. 5, and a different circuit that is known to the public may be used.

What is claimed is:

1. A wavelength division multiplexing device having a plurality of dispersion compensators for respectively compensating for dispersion of a plurality of optical signals of different frequencies, comprising:

an optical amplifier to amplify one of a plurality of optical signals of different frequencies that is modulated using a low-frequency signal;

a dispersion compensator to compensate for dispersion of an optical signal output from the optical amplifier;

a detection unit to detect the low-frequency signal in the optical signal; and a control unit to control to make the dispersion compensator perform a compensation operation by determining that the optical signal is being input when a low-frequency signal is detected in the optical signal in the detection unit, and to control to stop a compensation operation of the dispersion compensator by determining that there is an input break of the optical signal when a low-frequency signal is not detected in the optical signal in the detection unit; wherein the control unit includes storage unit to store information indicating whether or not a dispersion compensation amount is adjusted, and outputs, to the dispersion compensator, a previous dispersion compensation amount as an initial value when a low-frequency signal is detected in the detection unit and information indicating that a dispersion compensation amount is adjusted is stored in the storage unit.

2. The wavelength division multiplexing device according to claim 1, wherein:

the detection unit includes an optical-electrical converter to convert the optical signal into an electric signal; a low-pass filter to pass the low-frequency signal in a signal output from the optical-electrical converter; and a signal determination circuit to output a signal indicating whether or not the low-frequency signal is detected in the signal output from the low-pass filter.

3. The wavelength division multiplexing device according to claim 1, wherein:

the dispersion compensator or the control unit has a holding circuit to store an adjusted dispersion compensation amount; and the control unit makes the dispersion compensator perform the compensation operation using, as an initial value, the dispersion compensation amount stored in the holding circuit when input of the optical light is detected and the information indicating that a dispersion compensation amount is adjusted is stored in the storage unit.

4. A method of detecting an input break of an optical signal of a wavelength division multiplexing device having a plurality of dispersion compensators for respectively compensating for dispersion of a plurality of optical signals of different frequencies, the method comprising:

amplifying, using an optical amplifier, one of a plurality of optical signals of different frequencies that are modulated using a low-frequency signal;

compensating, using a dispersion compensator, for dispersion of an optical signal output from the optical amplifier;

detecting the low-frequency signal in the optical signal; and controlling to make the dispersion compensator perform a compensation operation by determining that the optical signal is being input when a low-frequency signal is detected in the optical signal, and controlling to stop a compensation operation of the dispersion compensator by determining that there is an input break of the optical signal when a low-frequency signal is not detected in the optical signal; wherein the controlling stores information indicating whether or not a dispersion compensation amount was adjusted in storage means, and outputs a previous dispersion compensation amount, as an initial value, to the dispersion compensator when the low-frequency signal is detected in the optical signal and information indicating that a dispersion compensation amount was adjusted is stored in the storage means.

5. The method of detecting an input break of an optical signal in the wavelength division multiplexing device according to claim 4, wherein:

the detecting converts the optical signal to be input into an electric signal, extracts the low-frequency signal from the electric signal using a low-pass filter, and detects an input break of the optical signal on the basis of whether or not the low-frequency signal is locked.

* * * * *